United States Patent

Staib et al.

[11] Patent Number: 5,842,753
[45] Date of Patent: Dec. 1, 1998

[54] ELECTROHYDRAULIC PRESSURE ADJUSTER FOR A SLIP CONTROLLED VEHICLE BRAKE SYSTEM

[75] Inventors: Helmut Staib, Schwieberdingen; Michael Friedow, Tamm, both of Germany

[73] Assignee: Robert Bosch GmbH, Stuttgart, Germany

[21] Appl. No.: 817,486

[22] PCT Filed: Sep. 20, 1995

[86] PCT No.: PCT/DE95/01291

§ 371 Date: Apr. 10, 1997

§ 102(e) Date: Apr. 10, 1997

[87] PCT Pub. No.: WO96/11827

PCT Pub. Date: Apr. 25, 1996

[30] Foreign Application Priority Data

Oct. 13, 1994 [DE] Germany ............... 44 36 618.3

[51] Int. Cl.⁶ ............... B60T 8/36; B60T 13/68; F15B 13/08; F15B 9/12
[52] U.S. Cl. ............. 303/119.3; 137/884; 303/113.1
[58] Field of Search ............. 303/119.2, 119.3, 303/DIG. 10, 113.1, 119.1; 137/884, 596.17; 251/129.01–129.22; 439/34, 130; 335/262, 263, 255, 250, 260, 213, 248, 257, 202, 209; 336/192

[56] References Cited

U.S. PATENT DOCUMENTS

| | | |
|---|---|---|
| 4,230,273 | 10/1980 | Claxton et al. . |
| 4,235,375 | 11/1980 | Melotti . |
| 4,785,848 | 11/1988 | Leiber ............... 137/596.17 |
| 5,009,250 | 4/1991 | Klihe et al. ............ 137/596.17 |
| 5,040,853 | 8/1991 | Burgdorf et al. ........ 303/113.1 |
| 5,374,114 | 12/1994 | Burgdorf et al. ........ 303/119.2 |
| 5,462,344 | 10/1995 | Jakob et al. ............ 303/119.3 |
| 5,474,108 | 12/1995 | Inden et al. ............... 137/884 |
| 5,482,362 | 1/1996 | Robinson ............... 303/119.3 |
| 5,520,447 | 5/1996 | Burgdorf et al. ........ 303/119.3 |
| 5,520,546 | 5/1996 | Klinger et al. ........... 439/140 |

FOREIGN PATENT DOCUMENTS

| | | |
|---|---|---|
| 3439378 | 4/1986 | Germany . |
| 4100967 | 7/1992 | Germany . |
| 4306769 | 9/1996 | Germany . |
| 686658 | 1/1953 | United Kingdom . |
| 2074233 | 10/1981 | United Kingdom . |

*Primary Examiner*—Douglas C. Butler
*Attorney, Agent, or Firm*—Edwin E. Greigg; Ronald E. Greigg

[57] ABSTRACT

A pressure adjuster having electromagnetically actuatable valves, which are combined with a valve block. Each valve has one valve dome that protrudes from a support face of the valve block, and one coil alignable with and mountable on the valve dome. The coils are received in a cap secured to the valve block. The valve block is also provided with a spring element that encompasses the valve domes, for the axial-play- free positional fixation of the coils to the valve domes. By means of the shaping of the spring element, it is attained that this element, in the premounted state, engages the rows of outer valve domes with prestressing, but when the coils are mounted on the valve domes is lifted away from the coils. In the premounted state, the spring element is thus rendered captive. The electrohydraulic pressure adjuster can be used for slip-controlled vehicle brake systems.

6 Claims, 1 Drawing Sheet

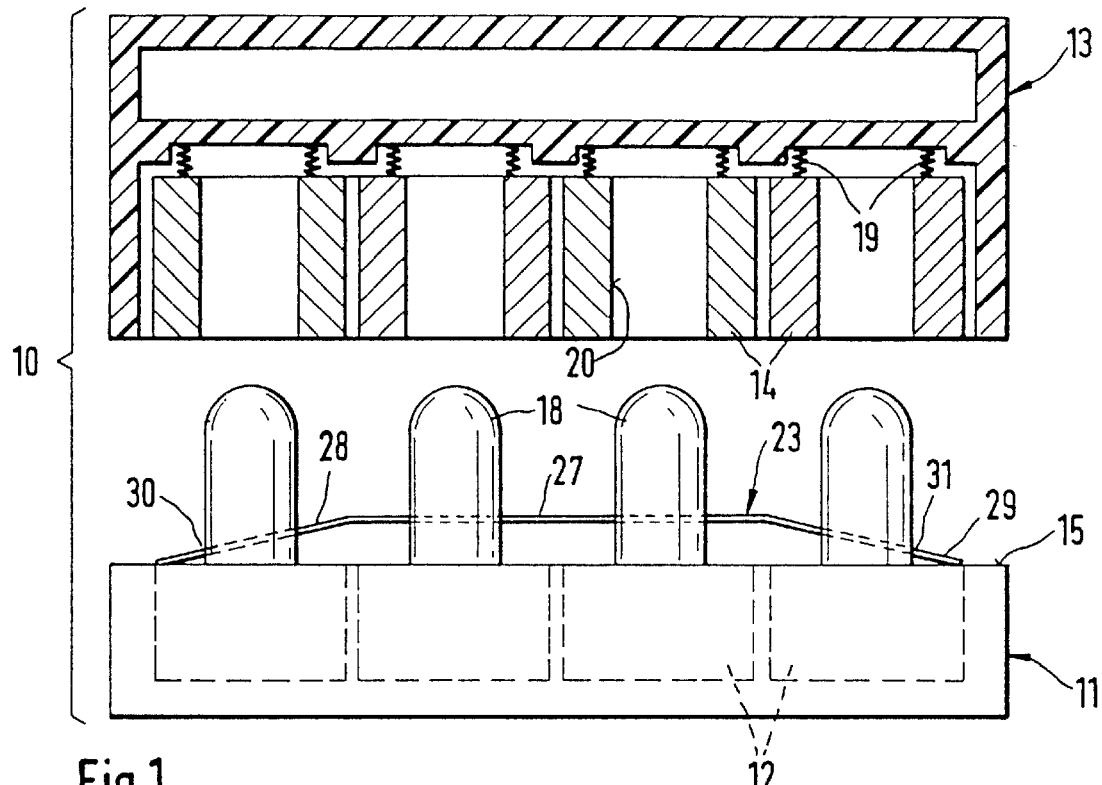
Fig.1
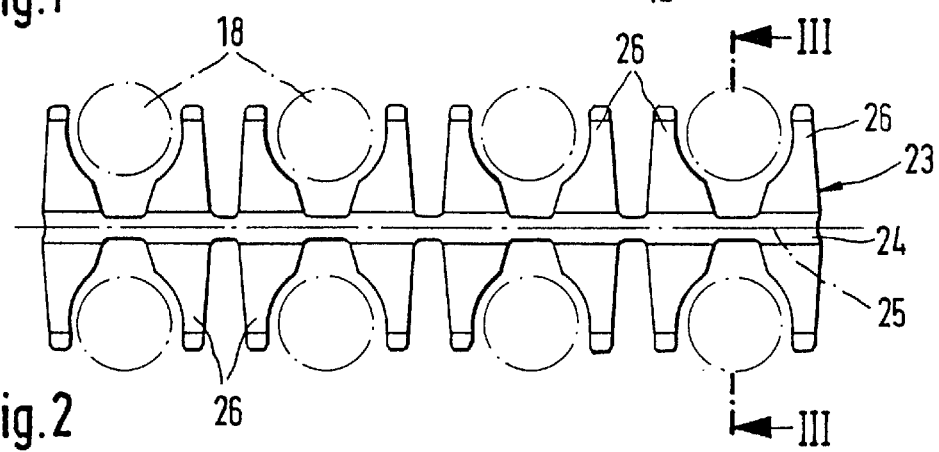
Fig.2
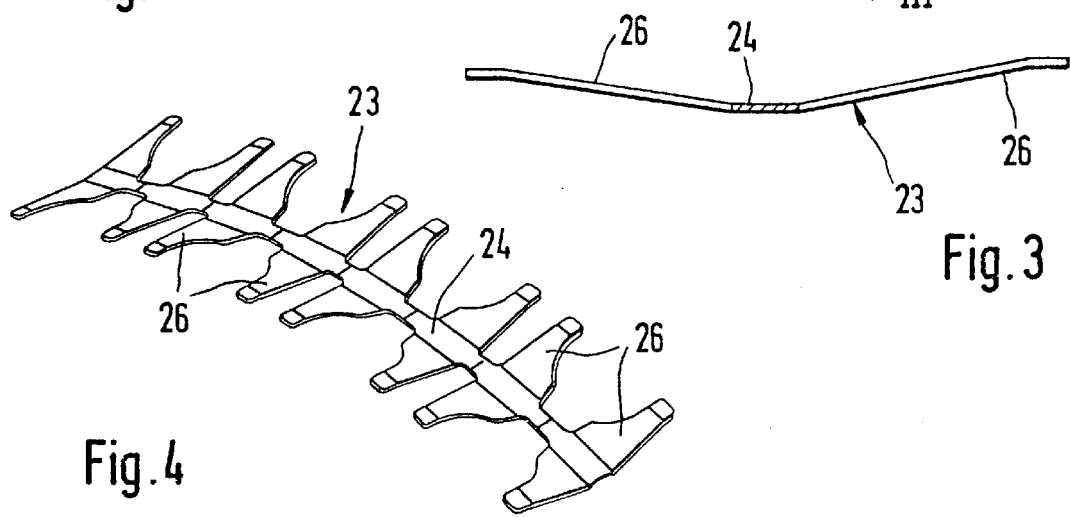
Fig.3
Fig.4

5,842,753

ELECTROHYDRAULIC PRESSURE ADJUSTER FOR A SLIP CONTROLLED VEHICLE BRAKE SYSTEM

PRIOR ART

The invention is based on an electrohydraulic pressure adjuster for a slip controlled vehicle brake system.

An electrohydraulic pressure adjuster of this kind is already known (German Patent Disclosure DE 41 00 967 A1), in which the coils of magnet valves are elastically resiliently suspended in a hoodlike cap so that when they are joined to a valve block they can be aligned relative to it, that is, radially and axially. To that end, elastic retainers in the form of helical compression springs are provided between the cap and the coils, in order to generate a force on the coils oriented toward the valve block. After the joining, the position of the coils is intended to be secured by means of a defined axial pressing of the coils against the valve block. However, as long as the joining operation has not yet taken place, the coils are supported in the cap on a stop, in order to absorb the force of the springs, so that contact elements that connect the coils to an electronic controller located above the coils in the cap will not be overloaded. At the same time, it is assured by the support that the springs will not be lost before the cap is joined to the coils.

ADVANTAGES OF THE INVENTION

The pressure adjuster according to the invention has the advantage of having a one-part spring element for many coils, which in the premounted state by simple nonpositive engagement assures its position on the valve block itself, yet when the coils are mounted on the valve domes relinquishes the nonpositive engagement and performed its function that axially stresses the coils. This merely utilizes the fact that the spring element, by deformation of its rib, has a longitudinal length that is shortened compared with its stretched-out length.

By the provisions recited herein, advantageous further features of and improvements to the pressure adjuster disclosed hereinafter are possible.

The embodiments of the invention recite shapings of the spring element that can be created in a simple way in order to shorten the length thereof in the unmounted state.

With the provision recited herein, a spring element is created that economizes on material and can be used for all the valves of two rows.

BRIEF DESCRIPTION OF THE DRAWING

Exemplary embodiments of the invention are shown simplified in the drawing and explained in further detail in the ensuing description. FIG. 1 shows a front view of a schematically shown pressure adjuster during the joining of coils, received in a cap, to a valve block with a spring element mounted on valve domes, in a first embodiment; FIG. 2 is a plan view on the spring element in the stretched-out state; FIG. 3 is a cross section of the spring element along the line III—III of FIG. 2 on a larger scale; and FIG. 4, in a three- dimensional view, shows a second embodiment of the spring element.

DESCRIPTION OF THE EXEMPLARY EMBODIMENTS

An electrohydraulic pressure adjuster 10 shown in FIG. 1 for a slip-controlled vehicle brake system substantially comprises a valve block 11, in which valves 12 are received, and a hoodlike cap 13, with electrical elements such as coils 14 disposed in the valve block for the electromagnetic actuation of the valve 12. FIG. 1 shows a state when the cap 13 is being joined to the valve block 11. In the fully assembled state, the cap 13 is combined with the valve block 11 along one support face 15 thereof and is connected by screws, not shown.

In the valve block 11, the valves 12 are disposed coincidently in two parallel rows, located one behind the other in the plane of the drawing. The valve combined with the valve block 11 each have one valve dome 18 protruding upward at a right angle from the support face 15. The coils 14 are received in a corresponding number and arrangement inside the cap 13. They are connected to an electronic controller, not shown, disposed in the cap 13 by means of resilient electrical contact elements 19. Because of the resilience of the contact elements 19, the coils 14 can be subjected to changes of their position in the cap 13 in the axial and radial direction relative to their longitudinal axis. Changes of position of the coils 14 occur when the cap 13 is joined to the valve block 11 if the coils 14, which are adapted with their inner bore 20 to fit the diameter of the circular-cylindrical valve domes 18, are aligned relative to the valve domes as they are mounted on them. The resilience of the contact elements 19 makes it possible to compensate for tolerances in the position and axial course of the coil 14 and valve dome 18 that may occur despite precision manufacture.

In a pressure adjuster 10 mounted in a vehicle, it must be assured that the axial resilience of the coils 14 that is desired when the cap 13 is mounted on the valve block 11 be cancelled out under conditions that prevail during driving operation. To that end, a spring element 23 is disposed on the valve block 11. The spring element 23, shown in plan view in FIG. 2, has a longitudinally continuous rib 24, at which pairs of spring tongues 26 originate, extending essentially at a right angle to the axis 25 of the rib. When there are two parallel rows of valves 12 located coincidently one behind the other as in FIG. 1, the pairs of spring tongues 26 extend symmetrically to both sides of the axis 25 of the rib 24. The two spring tongues 26 of each pair each encompass one valve dome 18, as shown in FIG. 2 with the aid of the dot-dashed cross section of the valve domes 18. The spring element 23 is intended for engaging the free end toward the valve block of the respectively associated coil 14 with the free ends of the spring tongues 26, while the rib 24 is supported on the support face 15 of the valve block 11. For that purpose, the spring element 23 has a cross section of the kind shown on a larger scale in FIG. 3. When the cap 13 is mounted on the valve block 11, the spring tongues 26 of the spring element 23 effect an axial- play-free support of the coils on the cap 13.

The pressure adjuster 10 should advantageously be pre-mounted in two structural groups, one of which forms the cap 13 with the coils 14 disposed in it, along with other electrical components not shown, while the other includes the valve block 11 with the valve 12. As FIG. 1 shows, the spring element 23 is assigned to the component group of the valve block 1 and is received between the two rows of valves 12. While FIG. 2 shows the stretched-out position of the spring element 23, in which the spring tongues 26 encompass the valve domes 18 with radial play, FIG. 1 shows a first embodiment of a spring element with a form that deviates from the flatness of the rib 24. The spring element in fact has a straight, flat middle portion 27, extending parallel to the support face 15, which is adjoined on both sides by straight end portions 28 and 29 that are bent at an angle toward the support face. As a result, a shortening of the spring element 23 is attained, so that spring tongues 26 located in the region of its two ends engage mutually remote sides of the outer valve domes 18 of the two rows of valves with prestressing, specifically at the points designated 30 and 31 in FIG. 1. By means of such shortening of the spring element 23, it is attained in a simple way that the spring element, after being mounted on the valve domes 18, engages them nonpositively, which thus assures its position for the further manipulation of the component group. When the cap 13 is joined to the coils 14 on the valve block 11, the spring element 23 is pressed downward toward the support face 15, and the positive engagement is terminated by radial lifting up of the outer spring tongues 26 from the corresponding valve domes 18.

The longitudinal shortening of the spring element 23 is also attainable by some other kind of shaping. For instance, this can be accomplished by bending the rib 24 at an angle more than twice toward the same side, as is shown in FIG. 4 for a second embodiment. The rib 24 of the spring element 23, as a result of this multiple bending at a small angle, is lent a curved course. In a further feature, the rib 24 may also be provided with a uniform curvature along its longitudinal direction. Other shapings are also conceivable for attaining the desired shortening.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the U.S. is:

1. An electrohydraulic pressure adjuster (10), for a slip-controlled vehicle brake system, comprising electromagnetically actuatable valves (12) disposed in a row that are combined with a valve block (11) and which each valve has one valve dome (18), protruding from a support face (15) of the valve block, and one coil (14) that can be aligned with and mounted on the valve dome, a cap (13) that receives the coils (14), covers the valve domes (18) and can be secured to the valve block (11), and a spring element (23) that axially retains the mounted coils (14), the spring element (23) is a spring sheet with a rib (24) extending along the valve row, from which rib pairs of spring tongues (26) extend essentially perpendicular to the rib, the spring tongues each encompassing one valve dome (18) and extending between the support face (15) and the associated coil (14), the rib (24) of the spring element (23) has a shape that at least in part deviates from flatness, with the consequence of a shortening of the spring element (23), as a result of which, before the coils (14) are mounted on the valve domes (18), spring tongues (26) located in a region of the two ends of the spring element (23) engage two valve domes (18) on sides remote from one another, while when the coils (14) are mounted on the valve domes (18) the rib (24) is stretched out in a direction of its flatness.

2. An electrohydraulic pressure adjuster in accordance with 1, in which the rib (24) of the spring element (23) is provided on both sides of a flat middle portion (27) with end portions (28, 29) bent at an angle toward the same side.

3. An electrohydraulic pressure adjuster in accordance with claim 2, in which the rib (24) is bent at an angle more than twice over its length.

4. An electrohydraulic pressure adjuster in accordance with claim 1, in which the rib (24) is bent at an angle more than twice over its length.

5. The electrohydraulic pressure adjuster in accordance with claim 1, in which the rib (24) of the spring element (23) is curved in an arc over its longitudinal length.

6. The electrohydraulic pressure adjuster in accordance with claim 1, which comprises valves (12) disposed in two parallel rows next to one another, in which the pairs of spring tongues (26), on opposite sides of the rib (24) of the spring element (23) symmetrically to an axis (25) extending in the rib.

\* \* \* \* \*